Sept. 10, 1935. V. MENASCHÉ 2,013,969
APPARATUS FOR CAPTURING INSECTS
Filed April 21, 1934 2 Sheets-Sheet 1
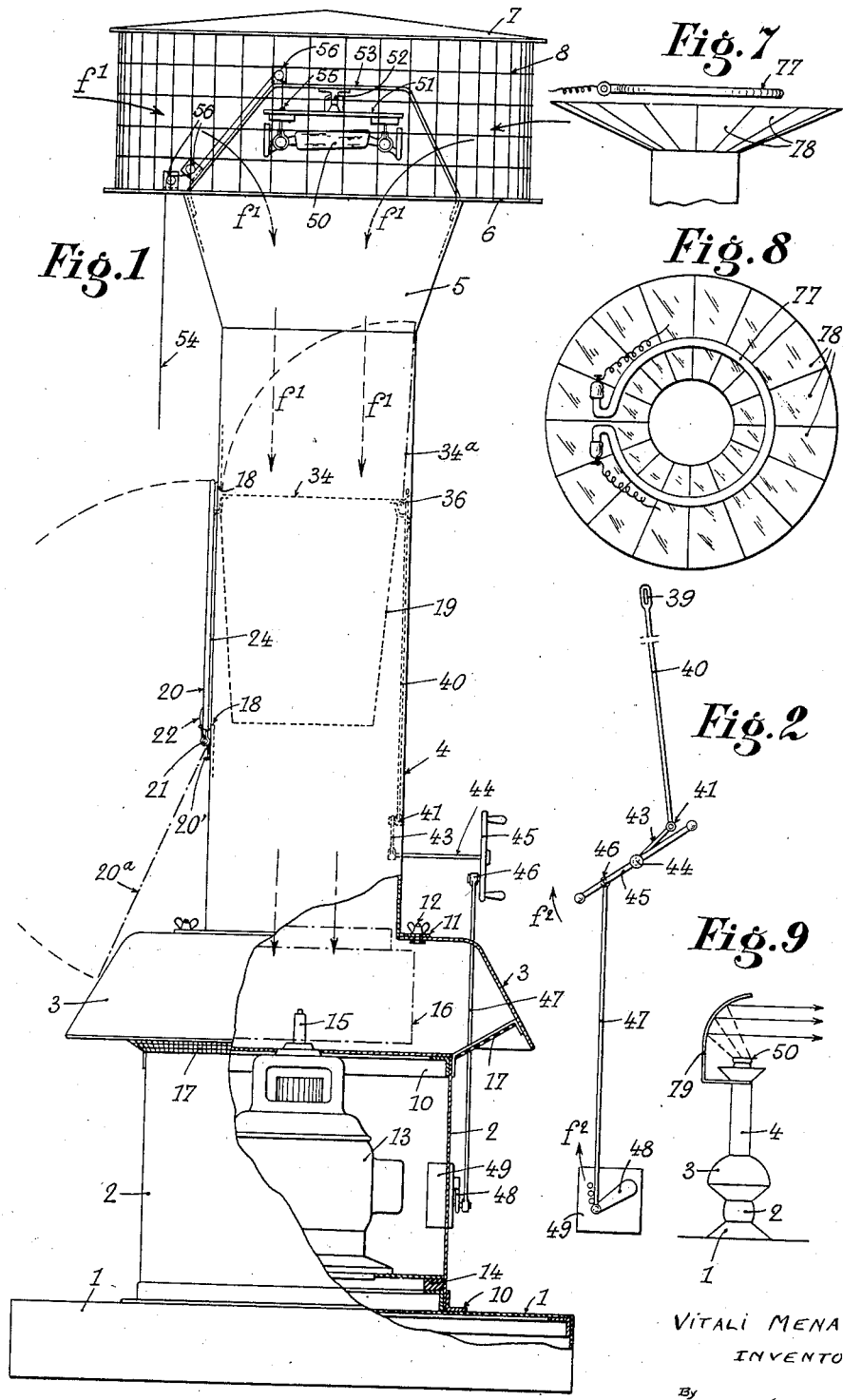
VITALI MENASCHÉ
INVENTOR
By Otto Munk
his Att'y Sept. 10, 1935.   V. MENASCHÉ   2,013,969
APPARATUS FOR CAPTURING INSECTS
Filed April 21, 1934   2 Sheets-Sheet 2
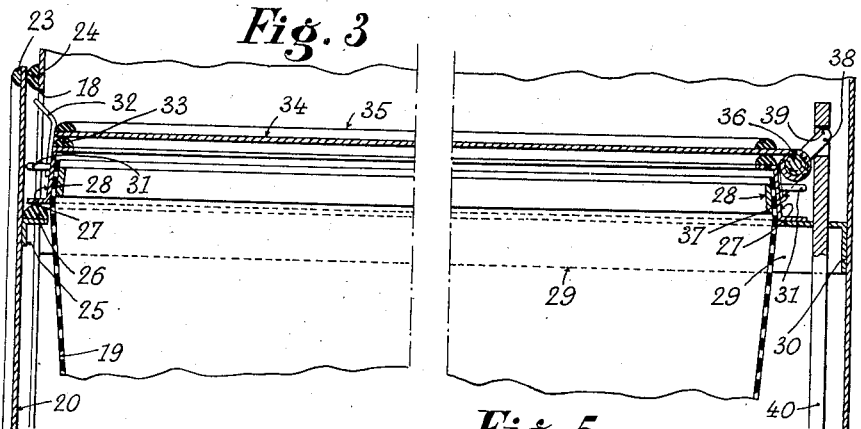
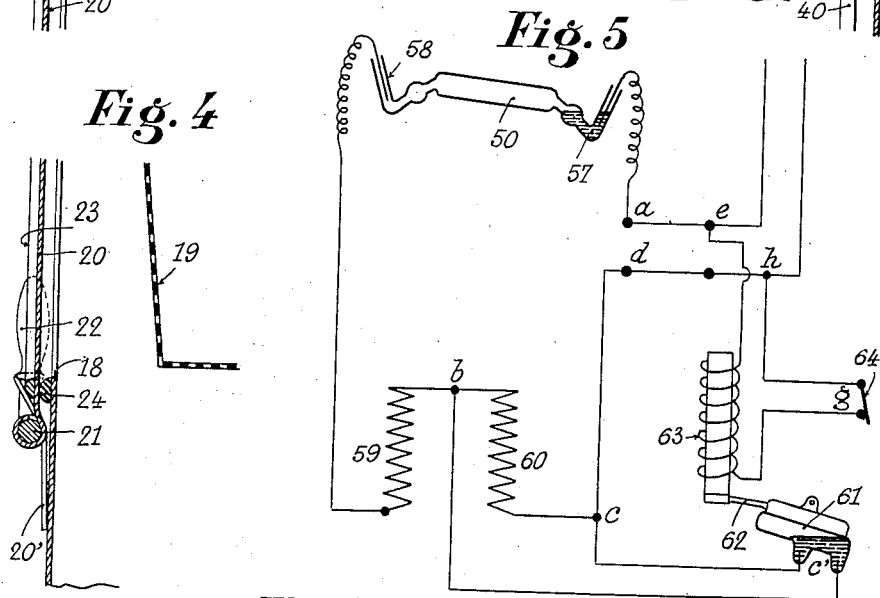
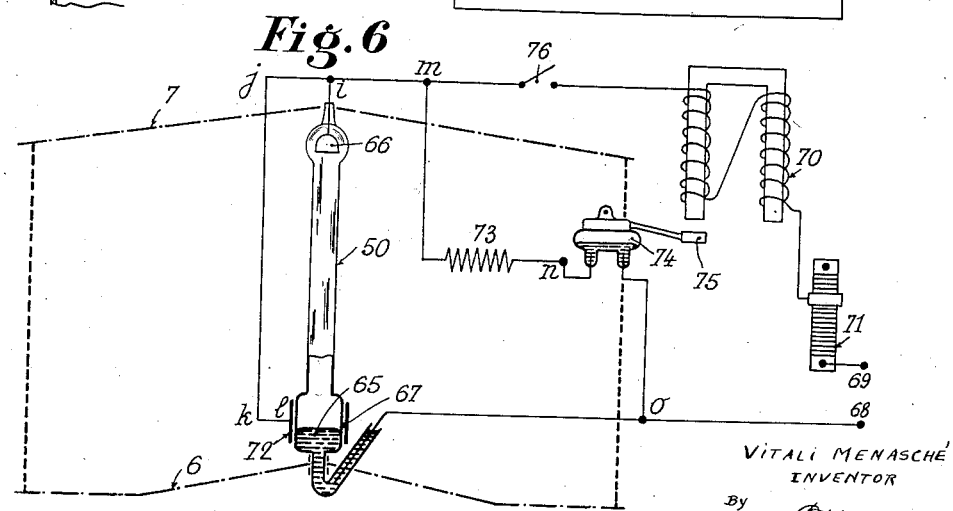
VITALI MENASCHÉ
INVENTOR
By Otto Munk
his Atty Patented Sept. 10, 1935

2,013,969

UNITED STATES PATENT OFFICE 2,013,969

APPARATUS FOR CAPTURING INSECTS

Vitali Menasché, Paris, France, assignor to No-mosquito, Paris, France, a limited-liability company Application April 21, 1934, Serial No. 721,730
In France December 27, 1933

7 Claims. (Cl. 43—139)

The present invention has for its object improvements in apparatus for capturing insects, of the type comprising a source of light which attracts the insects, and a suction device which draws the air through a perforated receptacle into which the insects are drawn and in which they are imprisoned.

These improvements and their advantages will be set forth in the description which follows.

In the accompanying drawings, which are given solely by way of example:

Fig. 1 is a view, in elevation, with partial section, of an improved apparatus according to the invention;

Fig. 2 is a view of the mechanical connections between the cover of the basket adapted to receive the insects, and the control of the electric motor driving the suction device;

Fig. 3 is a partial vertical section of the upper part of the removable basket, adapted to receive the insects and of its cover.

Fig. 4 is a partial vertical section showing the pivoting, on the column of the apparatus, of the door adapted to close the opening through which the basket is inserted in or removed from the column;

Fig. 5 is a circuit diagram, showing a simple means for varying the voltage applied to the source of light according to the insects to be captured;

Fig. 6 is another circuit diagram showing a vertical source of light;

Fig. 7 is a view, in elevation, of a modification of the optical device adapted to attract the insects;

Fig. 8 is a corresponding plan view;

Fig. 9 represents a modification of the apparatus, of a small size, adapted for use in a room, for example.

In the embodiment shown in Fig. 1, the body of the apparatus, made of metal, fibro-cement, or the like is formed, from bottom to top, of a base 1, a casing 2, a diffusing hood 3, a column 4, a connecting cone 5, a platform 6, and if desired of a roof 7, connected with the platform 6 by a netting 8 with large meshes adapted for the passage of the largest insects, such as butterflies, to be captured.

The elements 1 to 8 may be connected by means, for instance, of angle-pieces 10, flanges 11, screws and nuts 12. In the example shown, the body of the apparatus may be separated into three parts: the base 1, the casing 2 with its diffuser 3, and the remainder.

Obviously the horizontal section of the different parts of the apparatus may be as desired, circular, square or polygonal.

In the casing 2 is mounted an electric motor 13 resting preferably upon elastic blocks 14 of india-rubber or like material adapted for damping the vibrations. The shaft 15 of this motor is vertical, and is directed towards the top. To this shaft 15 is keyed a suction fan 16 which draws the air from top to bottom in the direction of the arrows $f^1$ through the netting 8 and the column 4, and discharges it through the deflector 3.

The outer wall of the deflector 3 is curved towards the bottom in such manner that the air which leaves the apparatus through the grating 17 will be directed towards the ground. In this way all eddies are avoided around the netting 8 and the flight of the insects towards the netting 8 is thus not hindered.

The column 4, having a square or rectangular section in the example represented, comprises, laterally, an aperture 18 (Figs. 1—3—4) for the introduction, into this column, of a perforated basket 19, adapted to be interposed in the circuit of the aspirated air and to receive the insects which are drawn along by this air.

The aperture 18 is provided with a door 20, which pivots, for example, on a lower axle 21 (Figs. 1 to 4). This door 20 which is provided with a handle 22 or other operating device, and preferably with an external stiffening frame 23, is applied upon a beading 24 (Figs. 1—3—4) mounted on the column 4 for a non-leaking fit.

The door 20, which a spring 20' tends to maintain in the raised position, comprises, also, not far from its upper edge, and on its inner face, an angle-piece 25 (Fig. 3) covered with a facing piece 26 of india rubber or other yielding material.

The basket 19, the form of which is prismatic or cylindrical, or preferably, a truncated pyramid or cone, consists of trelliswork, fine wire netting, wire gauze or net fabric, mounted on an upper frame having, in plan, the form and dimensions of the internal section of the column 4. This frame consists, for example, of an external fitting 27 (Fig. 3) the section of which has the form of a Z, and of an internal fitting 28 of flat section, the upper edge of the netting or the wire gauze being held between these two fittings 27 and 28.

The lower horizontal flange of the external fitting 27 rests upon the horizontal flanges of two lateral angle-pieces 29 and of a rear angle-piece 30 (Fig. 3) mounted on the column 4 and also upon the facing piece 26 carried by the horizontal flange of the angle-piece 25.

At the exterior, the fitting 27 is provided with handles 31, and it comprises, on the side adjacent the door 20 a flexible strip 32 forming a spring and extending, at the top, above the upper flange of the said fitting 27.

This upper flange of the fitting 27 carries a strip for a non-leaking joint 33 (Fig. 3) upon which is brought down, for the closing of the basket, a cover 34 (Figs. 1—3) of sheet metal, preferably stiffened by an upper frame 35. This cover 34 is secured to an axle 36 turning at its ends in two lugs 37 mounted on the fitting 27. The axle 36 carries an arm 38 (Fig. 3), which, when the basket 19 is placed in the column 4, engages, at its end, in the eye 39 (Figs. 2 and 3) of a rod 40 (Figs. 1—2—3). This rod 40 is pivoted, at its lower end at 41 (Figs. 1—2) to a crank arm 43, keyed to an axle 44 which turns in the column 4 and extends out of the latter. This axle 44 carries at its outer end a crank lever 45, of which one of the intermediate points 46 is connected, by a link 47, with the handle 48 either of a rheostat 49 mounted in the supply circuit of the motor 13, or of a starting switch.

The upper platform 6 carries an electric source of light 50 (Fig. 1) of any usual type, a mercury vapour lamp for example. This lamp is of quartz, so as not to stop the ultra-violet rays.

The support 51 of this lamp is pivoted at 52 to a strap 53, and the oscillations of the support 51, in order to initiate the lighting of the lamp, are assured in any suitable manner, for example by a flexible cable or wire 54 fixed, at 55, to the support 51 and passing over a set of supporting pulleys 56.

Preferably, the lamp 50, its support 51 and the strap 53 are slightly unsymmetrical, in order to restore the equilibrium of the apparatus, taking account of the effort exerted upon the cable 54 and of the weight of this cable.

The operation and the method of use of this apparatus are as follows:

The apparatus being stopped, with the door 20 turned down at 20ª (Fig. 1), the basket 19, the cover 34 of which is turned down and is held in place by the strip 32 (Fig. 3) (forming a spring is placed in position.) This basket 19 is slid into its place by means of the angle-pieces 27. When the basket 19 is in position, the arm 38 engages in the eye 39 of the rod 40. The door 20 is raised, by means of the handle 22 and is held in the raised position by the spring 20'. The contact between the strip 26 (Fig. 3) and the lower face of the lower flange of the fitting 27 of the basket 19, assures a tight joint between the frame of the basket and the door 20, thus preventing all passage of air between these parts during the suction, which, due to this fact, can only take place through the basket.

By the use of the handle 45 or the handle 48 of the rheostat or of the starting switch, the motor 13 is started. This operation causes the rotation of the handles 45 and 46 in the direction of the arrows $f^2$ (Fig. 2), and the rod 40 is thus displaced towards the bottom. It draws upon the arm 38 (Fig. 3), and this forces the cover 34 to turn towards the top into the position 34ª (Fig. 1).

The basket 19 is thus automatically opened, as soon as the suction fan 16, operated by the motor 13, commences its suction and hence there is no risk of producing a vacuum in the interior of the column 4.

The insects are attracted by the rays sent out, they fly towards the apparatus, and are drawn in. They are drawn into the basket 19, in which they are maintained by the current of air.

When the motor 13 is stopped by means of the handles 45 or 48, the cover 34 is turned down accordingly, upon the basket 19, and thus the insects are imprisoned in the basket, just at the time when the suction ceases.

The door 20 is then opened and the basket 19 removed by sliding it on the angle-pieces 29.

The spring strip 32 holds the cover 34 down, and permits of avoiding its improper opening during the transportation or handling.

The disposition described presents in addition to its automatic action, other advantages, and chiefly the following: The cover of the basket is opened positively by the operator and not by the action of the aspirated air, and this affords a good efficiency of the suction device.

The insertion and the removal of the receiver 19 for the insects being effected through a lateral opening, the whole of the upper part of the apparatus: netting 8, platform 6, support 53 of the lamp 50, and roof 7, may be mounted quite rigidly and permanently.

On the other hand, as the insertion of the basket 19 takes place near the middle of the apparatus, its insertion and its removal are facilitated, and a ladder is not required, as in the case in which this basket must be inserted through the top of the column.

The whole apparatus has thus, in short, a maximum efficiency, it offers a perfect safety in operation, and the insects captured cannot subsequently escape.

Obviously, the source of light may be of any kind, but one or the other of the arrangements represented in Figs. 5—6—7—8 may be advantageously utilized.

Fig. 5 represents, diagrammatically, a simple device permitting of making a selection of the insects. Experience has in fact shown that the insects are not all attracted by rays having the same wave-length.

The arrangement shown permits, according to a new method, forming part of the present invention, of varying the substantially constant electric tension at the terminals of the lamp. This variation is obtained by the insertion or removal of an additional resistance in the circuit supplying the lamp.

According to the embodiment illustrated, one of the terminals 57 of the lamp 50 is connected directly at $a$ with one of the terminals of the source of electric current. The other terminal 58 leads to one end of a resistance 59 the other end of which is connected, by two circuits in parallel, $bcd$, $bc'cd$ with the other terminal of the source. In the circuit $bcd$ is placed a second resistance 60. In the other circuit $bc'cd$ is placed a switch 61 of any type, for instance of the mercury type. This switch 61 is connected with an armature 62 subjected to the action of an electromagnet 63 the exciting circuit $egh$ of which is connected in shunt on the ends of the source. This circuit $egh$ is controlled by a hand contact device 64.

The operation is as follows: when the contact device 64 is closed, the armature 62 is attracted by the electromagnet 63, and the circuit $bc'cd$ is closed. The resistance 60 is shunted. The difference of potential at the terminals of the lamp has a given value E; this corresponds to a given tension of the mercury vapour in the lamp 50 and to a certain range of wave-lengths of the rays emitted.

If the switch 64 is opened, the electromagnet 63 no longer attracts the armature 62 of the receiver 61, and it thus drops. The circuit bc'cd which shunts the resistance 60 is broken, and this resistance 60 is put in series with the resistance 59. The difference of potential at the terminals of the lamp 50 has only a value E' which is less than the preceding value E, the tension of the mercury vapour is less, and the range of wave-lengths of the rays sent out is narrower than in the preceding case.

In the example shown in Fig. 6, the lamp 50 is placed vertically, and this permits to obtain, accurately, the same intensity of the rays in all directions. On the contrary to the normal lamps, the vertical lamp 50, made of quartz or silica, comprises only one mercury electrode, the negative one 65; the positive electrode consists of a metallic electrode 66. The lower part of the lamp containing the mercury is enlarged, at 67, in such way as to assure the condensation of the vaporized mercury. The lighting of the lamp is static, that is, it lights without being tipped over, and by the discharge of a condenser.

According to the example illustrated, the cathode 65 is connected directly with the terminal 68 of the source of electric current, as regards the anode 66, it is connected with the other terminal 69 of the source of current, through an electromagnet 70 and a regulating resistance 71. In parallel with the lamp 50 are connected two circuits, one, *ijkl*, connected, on one side, with the anode 66, and on the other side, with a metallic piece 72 mounted on the bulb 67 and forming a condenser with this insulating bulb and the cathode 65, the other, *imno*, comprises a resistance 73 and a switch 74, for example, of the mercury type, the armature 75 of which is actuated by the electromagnet 70.

A switch is placed at any point in the principal circuit, for example at 76.

The operation is as follows: when the switch 76 is closed, the current follows the circuit 69—70—*mno*—68. The electromagnet 70 attracts the armature 75 of the switch 74, and the two electrodes of this switch, at first connected together by the mercury, now separate. The spark of the break thus produced, causes the discharge of the condenser 72—67—65. A high tension is thus supplied to the terminals of the mercury lamp 50. This tension ionizes the interior of this lamp, which becomes a conductor. It lights up, and the current passes normally according to the circuit 69—70—*i*—66—65—68. During the operation of the lamp, the switch 74 remains open.

Instead of a lamp a luminescent tube 77 (Figs. 7—8) filled with mercury vapour may be used. This tube may have a circular form in order not to form an obstacle to the drawing in of large insects such as butterflies. The tube 77 consists of silica or quartz, in such manner as to let the ultra-violet rays pass. The tube is supplied, in a manner known in the art of lighting, by luminescent tubes, or by a transformer provided with several terminals permitting of varying, at will, the intensity either by a Ruhmkorff coil the regulation of which is varied by screwing or unscrewing the screw of the break device. By this regulation the range of wave-lengths of the rays emitted by the luminescent tube is varied, and the one which is the most favourable for a given species of insects can be determined.

The apparatus with a lamp or a luminescent tube may advantageously comprise, on the platform 6 or in the place of this platform, reflectors 78 (Figs. 7 and 8) with reflecting surfaces directed upwardly, and which will permit of reflecting into the atmosphere the rays which fall upon the platform; obviously, in this case the apparatus does not comprise a roof.

Finally, in Fig. 9, a modification of an apparatus of small size is illustrated which can be placed in the room of a flat, in a bedroom, for example. This apparatus comprises a reflector 79 adapted to direct the rays sent out by the lamp or by the tube 50, towards the window or windows of the room.

Preferably, the reflector 79, the nature of which may be as desired, will only be placed at the upper part of the apparatus, so that the occupants of the room may profit by the ventilation due to the current of air issuing from the deflector 3.

Obviously, the invention is not limited to the methods of execution illustrated and described, which are given solely by way of example. In the case, chiefly, of the device shown in Fig. 5, there may be provided several resistances in parallel, having different values, each permitting of obtaining a range of wave-lengths which is well determined. These resistances will be put in circuit or out of circuit either directly or through the intermediary of one or more suitable relays, controlled in any way, by slide, button, lever, or the like.

Having now described my invention what I claim as new and desire to secure by Letters Patent is:

1. An apparatus for capturing insects comprising in combination a conduit provided with a lateral aperture, a luminous source at one end of said conduit, suction means at the other end of said conduit adapted to draw air through said conduit, supporting means carried by said conduit opposite said aperture, a perforated container having its open end directed towards the luminous source and adapted to be introduced into and removed from said conduit through said aperture and adapted to be held in said conduit by said supporting means, and a door adapted to cover said aperture.

2. An apparatus for capturing insects comprising in combination a conduit provided with a lateral aperture, a luminous source at one end of said conduit, suction means at the other end of said conduit adapted to draw air through said conduit, a perforated container having its open end directed towards the luminous source and adapted to be introduced into and removed from said conduit through said aperture, cooperating guiding means carried by said conduit and by said container and adapted to guide and to support said container during its introduction into and removal from said conduit, and a door adapted to cover said aperture.

3. An apparatus for capturing insects comprising in combination a conduit provided with a lateral aperture, a luminous source at one end of said conduit, suction means at the other end of said conduit adapted to draw air through said conduit, control means for said suction means adapted to assume two positions corresponding respectively to the suction means being operative and inoperative, supporting means carried by said conduit opposite said aperture, a perforated container having its open end directed towards the luminous source and adapted to be introduced into and removed from said conduit through said aperture and adapted to be held in said conduit by said supporting means, a pivoted cover for said open end of said container, connecting means between said cover and said control means, whereby said cover is in the open position when said suction means are operative and in the closed position when said suction means are inoperative, and a door adapted to cover said lateral aperture in said conduit.

4. An apparatus for capturing insects comprising in combination a conduit provided with a lateral aperture, a luminous source at one end of said conduit, suction means at the other end of said conduit adapted to draw air through said conduit, control means for said suction means adapted to assume two positions corresponding respectively to the suction means being operative and inoperative, supporting means carried by said conduit opposite said aperture, a perforated container having its open end directed towards the luminous source and adapted to be introduced into and removed from said conduit through said aperture and adapted to be held in said conduit by said supporting means, a pivoted cover for said open end of said container, an actuating member adapted to be removably engaged by said cover when said container is introduced into said conduit, connecting means between said actuating member and said control means, whereby said cover is in the open position when said suction means are operative and in the closed position when said suction means are inoperative, and a door adapted to cover said lateral aperture in said conduit.

5. An apparatus for capturing insects comprising in combination a conduit provided with a lateral aperture, a luminous source at one end of said conduit, suction means at the other end of said conduit, adapted to draw air through said conduit, a perforated container having its open end directed towards the luminous source and adapted to be introduced into and removed from said conduit through said aperture, cooperating supporting means carried by said conduit and by said container opposite said aperture and adapted to hold said container in said conduit and to prevent air from passing between said conduit and said container, a door adapted to cover said aperture, and packing means between said door and said container adapted to prevent air from passing between said door and said container.

6. An apparatus for capturing insects according to claim 1 comprising further deflecting means at the end of said conduit adjacent said suction means and adapted to guide the air having passed through said conduit in a direction substantially opposite to the direction of the luminous source.

7. An apparatus for capturing insects comprising in combination a conduit, a source of electric current, luminous means at one end of said conduit adapted to be made operative by said source of current, connecting means between said source of current and said luminous means, potential regulating means inserted in said connecting means and adapted to vary the tension applied on said luminous source and consequently to vary the wave-lengths of the light beams issued from said luminous source according to the selected insects to be captured, suction means at the other end of said conduit adapted to draw air through said conduit, supporting means carried by said conduit, and a perforated container having its open end directed towards the luminous means and adapted to be held in said conduit by said supporting means.

VITALI MENASCHÉ.